April 28, 1964   A. E. R. ARNOT   3,130,766
SOLID TYRES
Filed July 3, 1961

3,130,766
SOLID TYRES
Alfred Erwin Reginald Arnot, The Bell House,
Baughurst, Basingstoke, Hampshire, England
Filed July 3, 1961, Ser. No. 121,660
5 Claims. (Cl. 152—41)

This invention is concerned with solid elastic tyres, more particularly for use with industrial stacking, lifting and transporting trucks, tractors and trailers.

It is an object of the invention to provide means for obtaining shock-reducing resilience comparable to a pneumatic tyre in a wheel employing conventional replaceable solid elastic press-on tyres.

It is a further object to provide an elastic-tyred wheel in which the load-carrying tread is not a primary source of resilience, so that the tread material may be chosen for better load-carrying, floor adhesion, wear-resisting or similar characteristics.

It is yet a further object to provide an elastic-tyred wheel having separate resilient means which may be independently chosen for minimum hysteresis loss, thereby reducing rolling resistance of the wheel.

It is yet a further object to provide within press-on tyres resilient means all of which may participate in cushioning tyre loads at all times.

The growing use of industrial trucks and trailers which must carry heavy loads on small wheels, which would require unacceptable air pressures in pneumatic tyres and present serious hazards of vehicle instability if such pressures were not constantly supervised, has led to the increased use of solid elastic tyres bonded to cylindrical steel bands. It will be appreciated that in a construction of this form, only the segment of elastic material lying between the ground-contact area and the corresponding portion of the steel band is responsive to road shocks or carrying load at any instant, whilst all the remaining material around the wheel periphery is idle; whereas in the pneumatic tyre any load or shock causes local tread deflection and therefore increased ground-contact area to support the additional force, the unit pressure in the tyre and on the ground-contact surface remaining practically constant as there is negligible change in volume of the total air capacity. Thus the whole volume of the pneumatic tyre is active at all times to maintain cushioning, resulting in much superior performance with less material than the solid elastic tyre.

Long experience has shown that existing solid elastic tyred metal bands do not fulfil an economic service life when used in arduous industrial conditions. This is due mainly to breakage of the bond between the tyre and band under shock load condition, the local rupture spreading rapidly in use until the whole tyre becomes detached.

Much development has been undertaken to improve the resilient qualities of the solid elastic tyre material, but the factors affecting bond strength, wear resistance, chip resistance, hysteresis loss or rolling resistance, resilience, load-carrying capacity and the like invariably militate against one another. Polyurethane, a more recently used synthetic elastomer, has many advantages of endurance as a tyre tread; but these are best developed in a comparatively thin tread of hard grade having little resilience; thus the resultant severity of shock loads imposes proportionately greater forces on the improved bond which is therefore still inadequate. Moreover any greater shock loads which may be carried safely by the tyre bond are merely transmitted to the vehicle with consequent damage to the parts which the resilience of a tyre was intended to protect.

Resilient wheels are well known in the field of rail vehicles, in which the resilient means must in any case be placed within the rigid rim; and in certain road wheels in which special constructions have been developed to give greatly increased deflections under load. Nevertheless it has not heretofore been apparent that separate resilient means mounted within conventional press-fit industrial tyres can provide the cushioning which has previously been considered to be an essential function of the tread material.

Moreover, it will be understood that the provision of separate resilient means which are not affected by reduced thickness of the tyre tread due to wear will provide continuously reliable protection against shock loads, thus permitting cheaper vehicle construction and reducing maintenance costs.

According to the present invention, therefore, there is provided a road wheel comprising a replaceable solid elastic tyred metal band or bands, a first element or elements constituting or attached to a hub, and intermediate resilient means supporting a second metal element or elements removably force fitted within said metal band or bands.

The elastic tyre may be of rubber or a synthetic elastomer such as polyurethane having good wear-resistant and load carrying characteristics, and the metal band may have a press-fit internal bore of conventionally standard dimensions, with chamfered inner edges to facilitate pressing on, and grooves for retaining rings or the like where desired.

The first metal element or elements may be pressings, castings, spinnings, fabrications or the like and may be screwed to, force fitted on or integral with the wheel hub or brake drum.

The intermediate resilient means may be rubber or a synthetic elastomer such as polyurethane, having a hardness suitable to support the tyre load with a desired deflection and having a low hysteresis loss and may be chosen to have desirable characteristics in special conditions such as low temperature. The material may be bonded chemically or with adhesive to the first or second metal elements, or may be attached to intermediate members. Moreover the material may be in the form of continuous rings, blocks, discs, corrugations or the like. Precompression of the material may be achieved by tightening of the hub fitting screws or separate screw means, or during press fitting of the tyre. Limitation of the amount of precompression may be determined by the final abutment of axial flanges, projections or spacers cooperating with the said first and second elements.

The second metal element or elements may be force fitted in the metal band or bands of the tyre by pressing in or by expanding their periphery with wedges, tapered screws or the like. Spring rings or locating shoulders on the outer periphery of the hub or inner bore of the metal band or bands may be provided to form an axial location for the said first or second metal elements.

The force/displacement characteristics of resilient wheels according to the invention may be matched to particular conditions of use by arrangement of the resilient means between surfaces which may be radial so that the material is in shear; axial so that the material is in compression; intermediately inclined with the material in combined shear and compression; or any combination of radial, axial or conical in continuous or subdivided areas.

Furthermore, a number of resilient units comprising resilient means attached to first and second metal elements, and having the same or different characteristics, may be fitted to a single hub and may carry a single elastic tyred band or a number of separate elastic tyred bands.

Limitation of radial deflection may be determined by the provision of radially spaced abutments cooperating with the hub and rim portions of the construction respectively, or by compression or hardness of the resilient material.

Axial rigidity of the wheel rim may be increased by mounting the resilient means at the greater possible radius, but axial flexibility equal to that of an equivalent pneumatic tyre can be advantageous.

The invention will now be further described with reference to the accompanying drawings, which will illustrate several embodiments by way of example only.

Figure 1:
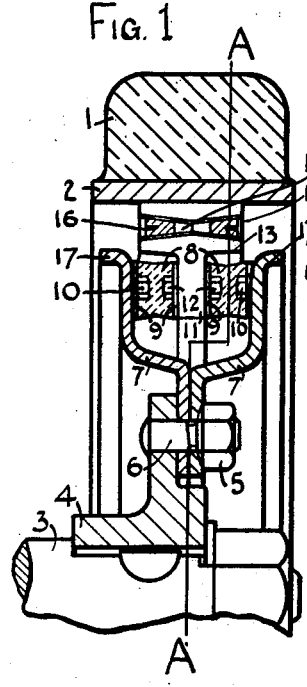
FIG. 1 is a part axial cross-section of a rubber-tyred wheel carried on separate shear blocks, with screwed wedge fitting into the tyre band.
Figures 2, 3:
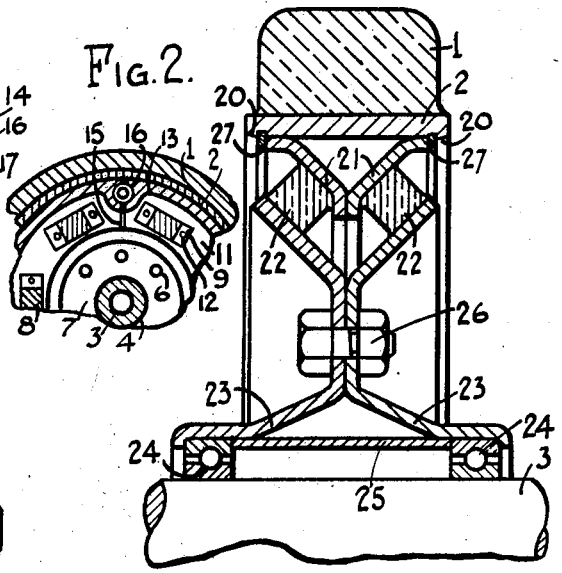
FIG. 2 is a part transverse section of the construction of FIG. 1 in a smaller scale taken on the line A—A.
FIG. 3 is a part axial cross-section of a rubber-tyred wheel carried on continuous rings of rubber in shear and compression.

More particularly, referring to FIGS. 1 and 2, 1 represents a solid rubber tread bonded to a steel band 2. An axle shaft 3 carries a hub 4, to which are secured by wheel nuts 5 on studs 6 to pressed steel side plates 7. Six rectangular shear units consisting of polyurethane blocks 8 bonded to metal plates 9 are equidistantly bolted to the inner radial surfaces of the plates 7 by bolts 10, and to the outer radial faces of a cast iron flanged ring 11 by bolts 12. In the space between one pair of shear unit mounting plates 9 the flange of ring 11 is locally enlarged at 13 and provided with axial tapered screw holes 14, the ring 11 being divided at this section 15 on a plane passing radially through the axis of the holes 14. Socket head grub screws 16 tightened into the tapered holes 14 expand the periphery of the ring 11, thereby gripping the inner bore of the band 2. Axial flanges 17 on the plates 7 are provided so that they abut on the inner bore of the band 2 at a pre-determined radial displacement between the band and the hub.

FIG. 3 represents a solid rubber tyre 1 bonded to a steel band 2, with chamfered inner edges 20 into which have been pressed two flanged dished pressings 21 with frustro-conical sides to which are cemented continuous rubber rings 22. The opposite faces of the rubber rings are cemented to two pressed side plates 23, shaped also to carry bearings 24 separated by a tube 25 and mounted on a shaft 3. The thickness of the rubber rings 22 is arranged so that when the inner edges of pressings 21 are in abutment, the inner faces of the plates 23 will be separated by an amount equal to a desired precompression until drawn together by bolts 26. Spring rings 27 carried in grooves in the band 2 restrain the pressings 21 from axial movement in the band. Radial displacement of the band is limited by choice of the conical angle of the rubber mounting faces of the pressings 21 and 23, and the hardness and cross-sectional area of the rubber therebetween.

Figure 4:
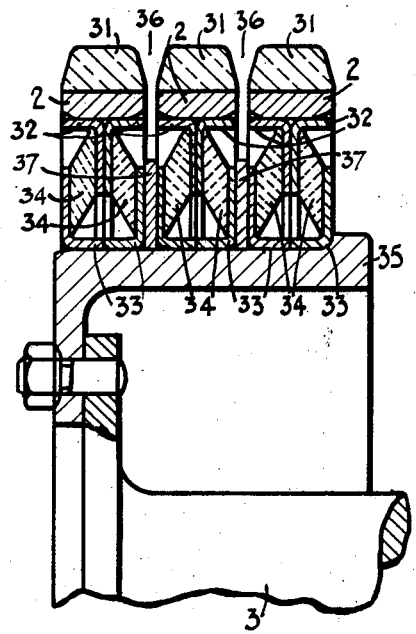
FIG. 4 is a part axial cross-section of a polyurethane-tyred wheel having multiple tyres separately resiliently mounted on a common brake drum.

In FIG. 4 three separate steel bands 2 carry solid polyurethan tyres 31. Each band is carried by a pair of identical resilient units comprising an outer flanged ring 32 with an inwardly radial inner face; an inner flanged ring 33 with an outwardly radial inner face; and a continuous frustro-conical band of rubber 34 bonded to the said inner faces. The outer radius of the inner ring 33 and the inner radius of the outer ring 32 are arranged to provide abutting stops with the corresponding inner radius of the outer flange and outer radius of the inner flange in the position of maximum displacement.

The flanged rings 32 are of an external radius to provide a press fit into the standard bore dimensions of the band 2, and of a thickness to exert and maintain a sufficient radial pressure when fitted to retain the band 2 under all conditions of working force. The rings 33 are similarly provided with an inner standard dimension for press fitting to the exterior of a hub or brake drum 35 carried by an axle 3.

The axial thickness of the bonded rubber bands 34 is arranged so that it is compressed to give additional strength to the bond when the inner edges of the flanges of the rings 33 are forced into abutment by press-fitting onto the hub or brake-drum 35. The press-fitting tolerance and thickness of the inner flange of the rings 33 is arranged to retain the discs in position under all conditions of working force and initial compression.

The separate tyre units may be mounted close together or divided by a gap 36 created by a spacing washer 37, or by making the flanges of the inner rings 33 wider than the outer flanges of the discs 32, to permit ejection of stones or the like.

Figure 5:
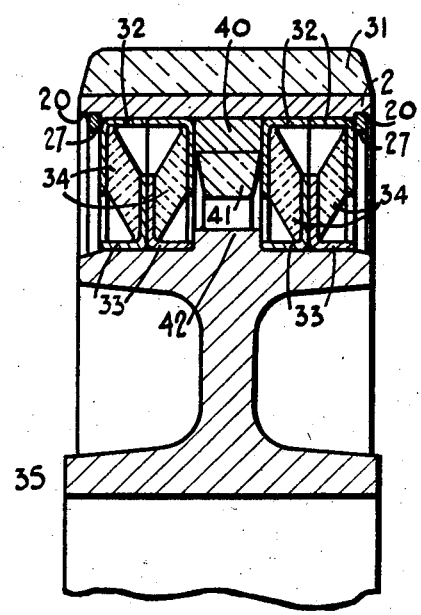
FIG. 5 is a part axial cross-section of a polyurethane-tyred wheel carrie don resilient units with differing characteristics.

In FIG. 5 a wide steel band 2 with chamfered inner edges 20 and spring retaining rings 27 is carried on two pairs of resilient units comprising outer flanged rings 32, inner flanged rings 33 and rubber bands 34 bonded between them, and separated by a steel spacing tube 40 to the inner surface of which is bonded a band of polyurethane 41. The resilient units are pressed onto opposite sides of a hub 35 having a spacing shoulder 42 on its periphery, and which cooperates with the inner surface of the band 41 to provide an elastic abutment to limit radial displacement of the band 2.

It will be readily understood that any combinations of the several features of the embodiments described may be put together to form a construction according to the invention.

What I claim is:

1. A solid tyred wheel for industrial lifting, stacking or transporting vehicles, comprising a plurality of cylindrical metal bands, a central hub structure, and for each of said metal bands, a solid tread of rubber-like material bonded to the outside of the band and a mounting consisting of two separate elements each comprising a frusto-conical ring of rubber-like material having bonded-on metal end plates each with an in-turned annular flange at one edge directed normally of the end plates, said elements being arranged co-axially with one another with their rings of rubber-like material in V-formation, one flange of each element being force fitted within the metal band and the other flange of the element being force fitted on said hub structure, all said resilient mounting elements being of corresponding size and form and being carried side-by-side on the hub structure in concentric relation therewith.

2. A solid tyred wheel for industrial lifting, stacking or transporting vehicles, comprising a plurality of cylindrical metal bands, central hub structure and for each of said metal bands, a solid tread of rubber-like material bonded to the outside of the band and a mounting consisting of two separate elements each comprising a frusto-conical ring of rubber-like material having bonded-on metal end plates each with an in-turned annular flange at one edge directed normally of the end plates, said elements being arranged co-axially with one another with their rings of rubber-like material in V-formation and with one end plate of one element in face to face engagement with one end plate of the other element and with the flanges on the other end plate of each element abutting in edge to edge relation, one flange of each element being force fitted within the metal band and the other flange of the element being force fitted on said hub structure, all said resilient mounting elements being of corresponding size and form and being carried side-by-side on the hub structure in concentric relation therewith.

3. A solid tyred wheel for industrial lifting, stacking or transporting vehicles, comprising a plurality of cylindrical metal bands, a central hub structure, and for each of said metal bands, a solid tread of rubber-like material bonded to the outside of the band and a mounting consisting of two separate elements each comprising a frusto-conical ring of rubber-like material having bonded-on metal end plates each with an in-turned annular flange at one edge directed normally of the end plates and overlying the other edge of the other metal end plate to form therewith a limit stop, said elements being arranged co-axially with one another with their rings of rubber-like material in V-formation, one flange of each element being force fitted within the metal band and the other flange of the element being force fitted on said hub structure, all said resilient mounting elements being of corresponding size and form and being carried side-by-side on the hub structure in concentric relation therewith.

4. A solid tyred wheel for industrial lifting, stacking or transporting vehicles, comprising a plurality of cylindrical metal bands, a central hub structure, and for each of said metal bands, a solid tread of rubber-like material bonded to the outside of the band and a mounting consisting of two separate elements each comprising a frusto-conical ring of rubber-like material having bonded-on metal end plates lying in part in overlapping relation with one another, each end plate having an in-turned annular flange at one edge directed normally of the end plates, said elements being arranged co-axially with one another with their rings of rubber-like material in V-formation, one flange of each element being force fitted within the metal band and the other flange of the element being force fitted on said hub structure whereby said rings of rubber-like material are held in pre-compression between the overlapping portions of their end plates, all said resilient mounting elements being of corresponding size and form and being carried side-by-side on the hub structure in concentric relation therewith.

5. A solid tyred wheel for industrial lifting, stacking or transporting vehicles, comprising a plurality of cylindrical metal bands, a central hub structure, and for each of said metal bands, a solid tread of rubber-like material bonded to the outside of the band and a mounting consisting of two separate elements each comprising a frusto-conical ring of rubber-like material having bonded-on metal end plates each with an in-turned annular flange at one edge directed normally of the end plates, said elements being arranged co-axially with one another with their rings of rubber-like material in V-formation, one flange of each element being force fitted within the metal band and the other flange of the element being force fitted on the hub structure, adjacent elements of adjacent mountings having their end plates with in-turned flanges force fitted on the hub structure disposed face to face with an interposed spacer ring whereby the adjacent edges of the in-turned flanges on the other end plates of the elements and the adjacent edges of the tyred bands surrounding the elements are held in spaced relation, all said resilient mounting elements being of corresponding size and form and being carried on the hub structure in concentric relation therewith.

References Cited in the file of this patent

UNITED STATES PATENTS

| | | |
|---|---|---|
| Re. 23,161 | MacLean | Oct. 25, 1949 |
| 1,451,269 | Patch et al. | Apr. 10, 1923 |
| 1,555,479 | Morand | Sept. 29, 1925 |
| 2,433,789 | Searles et al. | Dec. 30, 1947 |
| 2,667,767 | Burrell | Feb. 2, 1954 |
| 2,759,759 | Blackwood | Aug. 21, 1956 |
| 2,895,175 | Reuter et al. | July 21, 1959 |

FOREIGN PATENTS

| | | |
|---|---|---|
| 201,030 | Great Britain | July 26, 1923 |